United States Patent
Malkin et al.

(10) Patent No.: US 9,397,822 B1
(45) Date of Patent: Jul. 19, 2016

(54) SPLIT LOOP TIMING RECOVERY

(71) Applicant: APPLIED MICRO CIRCUITS CORPORATION, Sunnyvale, CA (US)

(72) Inventors: Moshe Malkin, Palo Alto, CA (US); Tarun Gupta, Santa Clara, CA (US)

(73) Assignee: APPLIED MICRO CIRCUITS CORPORATION, Santa Clara, CA (US)

( * ) Notice: Subject to any disclaimer, the term of this patent is extended or adjusted under 35 U.S.C. 154(b) by 0 days.

(21) Appl. No.: 14/736,754

(22) Filed: Jun. 11, 2015

(51) Int. Cl.
*H03D 3/24* (2006.01)
*H04L 7/00* (2006.01)
*H04L 12/26* (2006.01)

(52) U.S. Cl.
CPC ............ *H04L 7/0087* (2013.01); *H04L 7/0025* (2013.01); *H04L 7/0091* (2013.01); *H04L 43/087* (2013.01)

(58) Field of Classification Search
CPC ..... H04L 7/0029; H04L 7/033; H04L 7/0087; H04L 7/0025; H04L 7/0091; H04L 43/087; H04L 7/0337; H04L 2027/0053; H04L 7/0016; H03L 2207/50; H03L 7/0998; H03L 7/113; H03L 7/1974
USPC ......... 375/354–355, 371, 373, 375–376, 316, 375/346; 327/155–156, 147
See application file for complete search history.

(56) References Cited

U.S. PATENT DOCUMENTS

| | | | |
|---|---|---|---|
| 6,901,126 B1 * | 5/2005 | Gu | ........................ H03L 7/0998 375/354 |
| 7,302,014 B1 | 11/2007 | Barsoum | |
| 7,366,227 B2 | 4/2008 | Hwang et al. | |
| 7,460,587 B2 | 12/2008 | Pisoni | |
| 8,346,098 B2 | 1/2013 | Feng | |
| 8,670,459 B2 | 3/2014 | Barry et al. | |
| 8,781,333 B2 | 7/2014 | Hauske et al. | |
| 8,798,219 B2 | 8/2014 | Buchwald et al. | |
| 8,913,688 B1 | 12/2014 | Jenkins | |
| 9,036,764 B1 | 5/2015 | Hossain et al. | |
| 2008/0253493 A1 | 10/2008 | Aoyama | |
| 2009/0224807 A1* | 9/2009 | Philippe | ............... H03K 5/1565 327/105 |
| 2011/0075781 A1* | 3/2011 | Kenney | .................... H03L 7/235 375/376 |
| 2012/0169387 A1* | 7/2012 | Hara | .......................... H03L 7/16 327/156 |
| 2012/0200324 A1* | 8/2012 | Wang | ...................... H03L 7/093 327/156 |
| 2013/0107997 A1 | 5/2013 | Chen | |
| 2015/0078495 A1* | 3/2015 | Hossain | .................. H04L 7/033 375/346 |

OTHER PUBLICATIONS

International Search Report & Written Opinion for PCT Application Serial No. PCT/US2015/042797, mailed Mar. 14, 2016, 12 pages.

* cited by examiner

*Primary Examiner* — Khanh C Tran
(74) *Attorney, Agent, or Firm* — Amin, Turocy & Watson LLP (57) ABSTRACT

Various embodiments provide systems and methods for performing clock recovery on a received signal using a split loop architecture. A split loop timing recovery apparatus is provided comprising a first path configured for performing frequency offset tracking on a signal by adjusting a receiver clock frequency to match a remote transmitter frequency associated with the signal and a second path configured for tracking random jitter on the signal.

20 Claims, 5 Drawing Sheets

SPLIT LOOP TIMING RECOVERY

TECHNICAL FIELD

The subject disclosure relates to timing recovery in a receiver using split loop architecture where different components of the clock mismatch error are handled by different processing components.

BACKGROUND

In many clock recovery schemes used in transceivers, the timing recovery system uses a main analog element to control the recovered clock. For example, there is a voltage controlled oscillator ("VCO") based clock generation where the VCO control signal is generated to track both the clock jitter as well as a constant clock offset between the initial VCO frequency and clock used by the remote transmitter.

Another method to recover the remote transmitter clock is to use a delta-sigma modulation ("DSM") system to change the frequency of a provided clock source to track a remote clock system. For efficient design however, the tracking bandwidth of the DSM is limited. Another method is to use a phase interpolator based timing recovery system where the remote transmitter clock is recovered by passing a receiver clock source through different phase shifts such the PI clock output would be very close to the remote transmitted clock.

There are disadvantages to each approach however, as in very high speed communication systems where the timing error has to be very small (e.g. <0.5 picoseconds) the phase interpolator presents significant issues because of the integral nonlinearity (INL) and differential nonlinearity (DNL) of the phase-delay selection. The INL/DNL of the phase interpolator make it very challenging to compensate for a frequency offset between the local source and the remote transmitted clock. The DSM approach is limited by DSM loop BW. In high speed applications the TR loop bandwidth needs to be in the range of 1-50 MHz, which presents a very significant challenge for DSM type approaches The above-described description is merely intended to provide a contextual overview of current techniques for providing power grid interfaces in a server on a chip and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a split loop timing recovery apparatus includes a first path configured for performing frequency offset tracking on a signal by adjusting a receiver clock frequency to match a remote transmitter frequency associated with the signal. The split loop timing recovery apparatus also includes a second path configured for tracking random jitter on the signal.

In another example embodiment, a method for performing split loop timing recovery is provided. The method involves performing frequency offset tracking on a signal by adjusting a receiver clock frequency to match a remote transmitter frequency associated with the signal. The method also includes tracking random jitter on the signal using a phase interpolator.

In another example embodiment a system for split loop timing recovery is provided that includes a delta sigma modulation loop that is configured for performing frequency offset tracking on a signal by adjusting a receiver clock frequency to match a remote transmitter frequency associated with the signal. The system also includes a phase interpolator loop that is configured for tracking random jitter on the signal.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a system and method for performing clock recovery on a received signal using a split loop architecture. The frequency offset of the received signal can be tracked using a relatively low bandwidth path that changes the receiver clock's frequency to match the remote transmitter clock. An additional relatively high bandwidth path tracks high bandwidth random jitter. The first, low bandwidth path can utilize delta sigma modulation ("DSM"), and the second, high bandwidth path can be a phase interpolator. In this way, the slowly changing clock frequency offset is tracked through the delta sigma modulation loop so that the non-idealities of the phase interpolator do not cause large harmonics and resulting timing mismatch in the recovered receiver clock.

Similarly, the zero-mean jitter that is tracked through the phase interpolator is not as sensitive to the non-idealities as the fixed frequency offset and so is better suited to track the zero-mean clock jitter. The delta sigma modulation loop has relatively small bandwidth so it could even track changes in the oscillators that could happen as a result of slow drift, temperature changes, etc.

Figure 1:
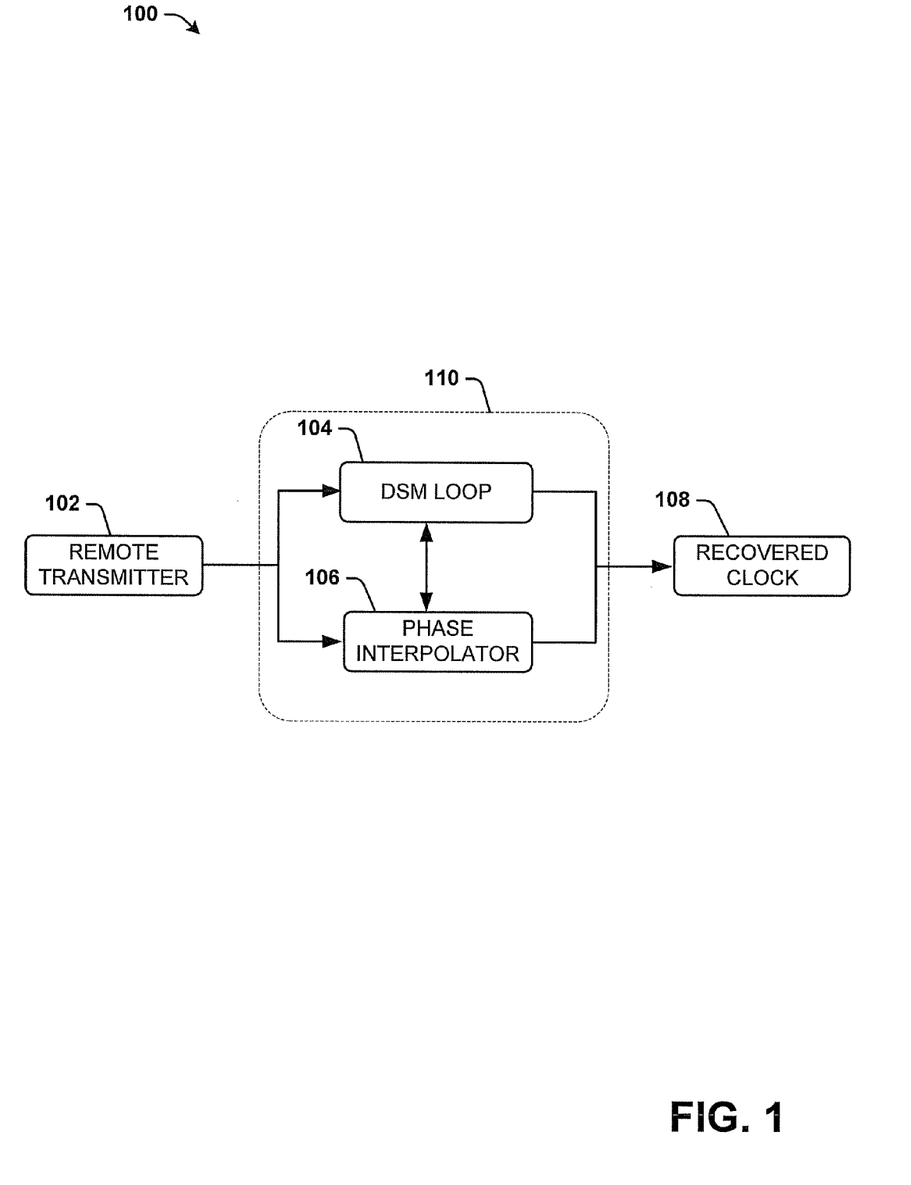
FIG. 1 is a block diagram illustrating another example, non-limiting embodiment of a split loop architecture for clock recovery in accordance with various aspects described herein.

Turning now to the illustrations, FIG. 1 illustrates an example, non-limiting embodiment of a split loop architecture for clock recovery in accordance with various aspects described herein. System 100 includes a split loop clock recovery system 110 that processes a-signal received from remote transmitter 102 and outputs a recovered clock signal 108.

Split loop clock recovery system 110 includes a delta sigma modulation loop 104 and a phase interpolator 106. The split loop clock recovery system 110 receives the signal from the remote transmitter 102 and separate components of the received signal are split between the delta sigma modulation loop 104 and the phase interpolator 106. The delta sigma modulation loop 104 is a low bandwidth loop that tracks the frequency offset of the received signal from remote transmitter 102 and changes the frequency of the receiver's clock to match the remote transmitter clock of the remote transmitter 102.

The phase interpolator 106 processes the other component of the received signal and tracks high bandwidth random jitter in the received signal. The path associated with the phase interpolator 106 can be a high bandwidth path in some embodiments. The phase interpolator 106 tracks the zero-mean jitter and since the phase interpolator 106 is not as sensitive to the non-idealities. Since the phase interpolator 106 is more sensitive to the fixed frequency offset however, the fixed frequency offset is tracked and corrected through the delta sigma modulation loop 104.

Figure 2:
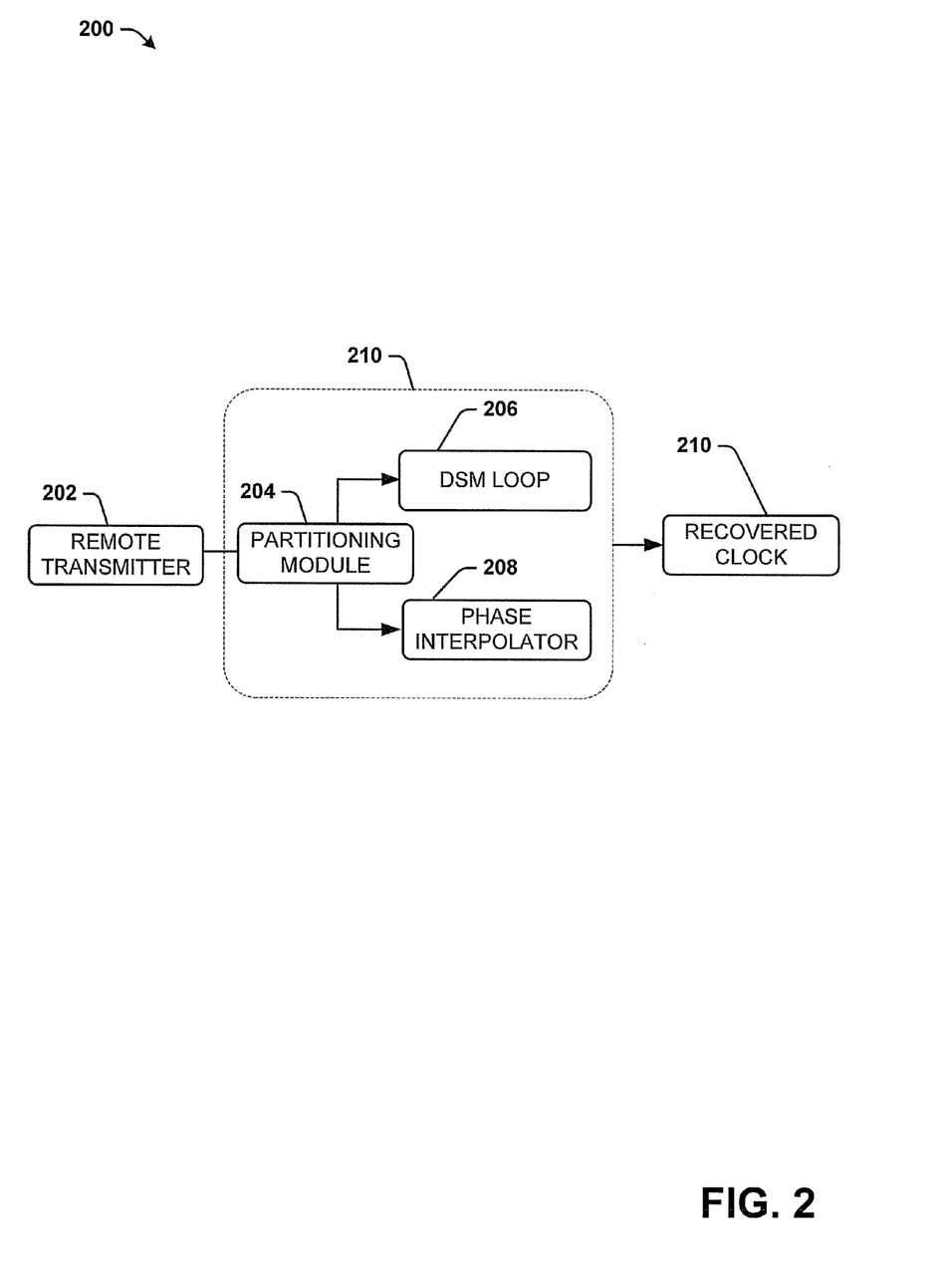
FIG. 2 is a block diagram illustrating an example, non-limiting embodiment of a split loop system that partitions bandwidth between paths in accordance with various aspects described herein.

Turning now to FIG. 2, illustrated is a block diagram of an example, non-limiting embodiment of a split loop system 200 that partitions bandwidth between paths in accordance with various aspects described herein. System 200 includes a split loop clock recovery system 210 that processes a signal received from remote transmitter 202 and outputs a recovered clock signal 210.

Split loop clock recovery system 210 includes a delta sigma modulation loop 206 and a phase interpolator 208. The split loop clock recovery system 210 receives the signal from the remote transmitter 202 and separate components of the received signal are split between the delta sigma modulation loop 204 and the phase interpolator 206.

In an embodiment, the delta sigma modulation loop 206 is a low bandwidth path that is configured for tracking frequency offset in the received signal and the phase interpolator 208 is a high bandwidth path configured for tracking zero-mean random jitter.

Depending on characteristics of the received signal, different bandwidths are more appropriate for tracking frequency offset and tracking zero-mean random jitter. For example, if the delta sigma modulation loop 206 has more or less bandwidth, it may have an easier or harder time tracking the frequency offset based on the base frequency, amount of offset, etc. Similarly, lower or higher bandwidth assigned to the phase interpolator 208 can make the tracking of the random jitter easier or harder based on the type of jitter or other characteristics of the received signal.

In an embodiment, partitioning module 204 can be configured to split bandwidth between the delta sigma modulation loop 206 and the phase interpolator 208 based on an analysis of the signal. The split loop clock recovery system 210 can have a limited amount of bandwidth, and the partitioning module 204 can be configured to partition the bandwidth between a few timing recovery elements (e.g., the delta sigma modulation loop 206 and the phase interpolator 208) using digital processing to assign the bandwidth.

Figure 3:
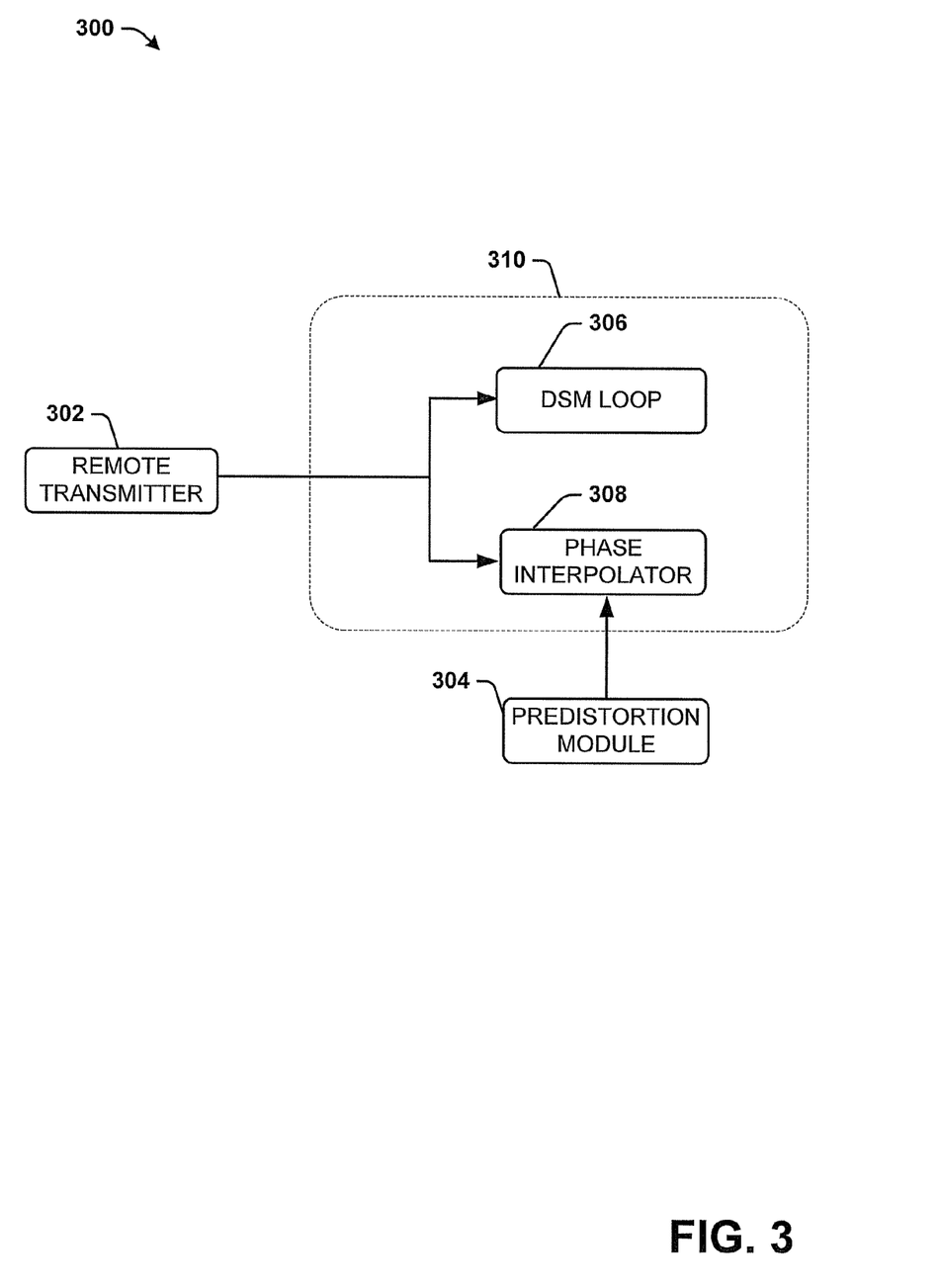
FIG. 3 is a block diagram illustrating an example, non-limiting embodiment of a system that predistorts a control signal in accordance with various aspects described herein.

Turning now to FIG. 3, illustrated is an example, non-limiting embodiment of a system 300 that predistorts a control signal in accordance with various aspects described herein. System 300 includes a split loop clock recovery system 310 that processes a signal received from remote transmitter 302 and outputs a recovered clock signal.

Split loop clock recovery system 310 includes a delta sigma modulation loop 306 and a phase interpolator 308. The split loop clock recovery system 310 receives the signal from the remote transmitter 302 and separate components of the received signal are split between the delta sigma modulation loop 304 and the phase interpolator 306.

In an embodiment, the delta sigma modulation loop 306 is a low bandwidth path that is configured for tracking frequency offset in the received signal and the phase interpolator 308 is a high bandwidth path configured for tracking zero-mean random jitter.

In an embodiment, a predistortion module 304 can be provided to predistort a control signal going into the path associated with the phase interpolator 308. The control signal can be predistorted before going into the phase interpolator 308 that reduces the distortion of the recovered phase interpolator 308 clock. The predistortion module 304 can predistort the control signal based on a lookup table.

Figure 4:
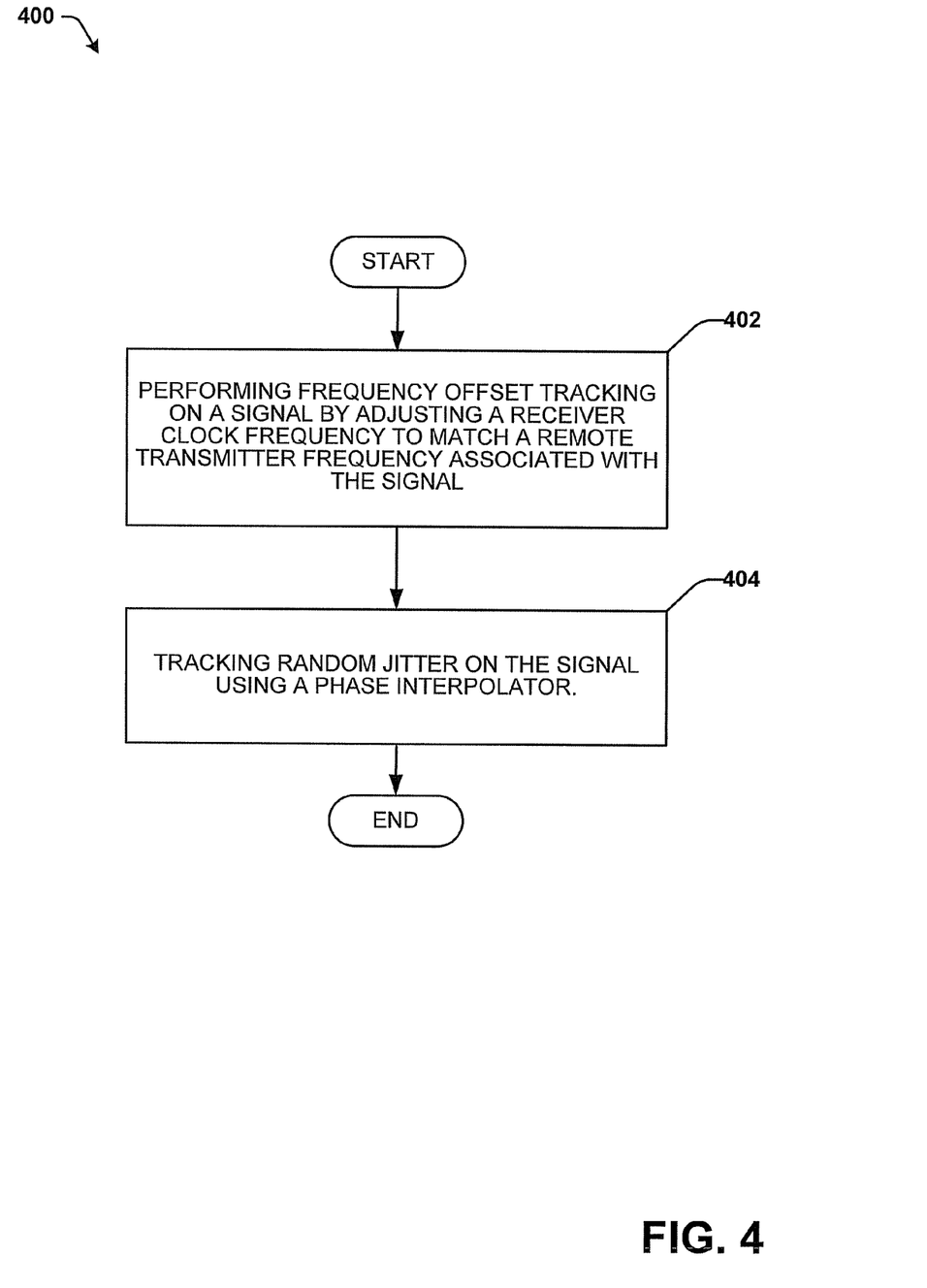
FIG. 4 illustrates a flow diagram of an example, non-limiting embodiment of a method clock recovery using a split loop architecture in accordance with various aspects described herein.

FIG. 4 illustrates processes in connection with the aforementioned systems. The process in FIG. 4 can be implemented for example by systems 100, 200, and 300 illustrated in FIG. 1-3 respectively. While for purposes of simplicity of explanation, the method is shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 4 illustrates a flow diagram of an example, non-limiting embodiment of a method clock recovery using a split loop architecture in accordance with various aspects described herein.

Method 400 can start at 402, where frequency offset tracking on a signal is performed by adjusting a receiver clock frequency to match a remote transmitter frequency associate with the signal. In an embodiment, the frequency offset tracking can be performed by a delta sigma modulation loop that is low bandwidth.

At 404, the random jitter can be tracked using a phase interpolator. The phase interpolator can be assigned a high bandwidth to track the zero-mean random jitter.

Exemplary Computing Environment

Figure 5:
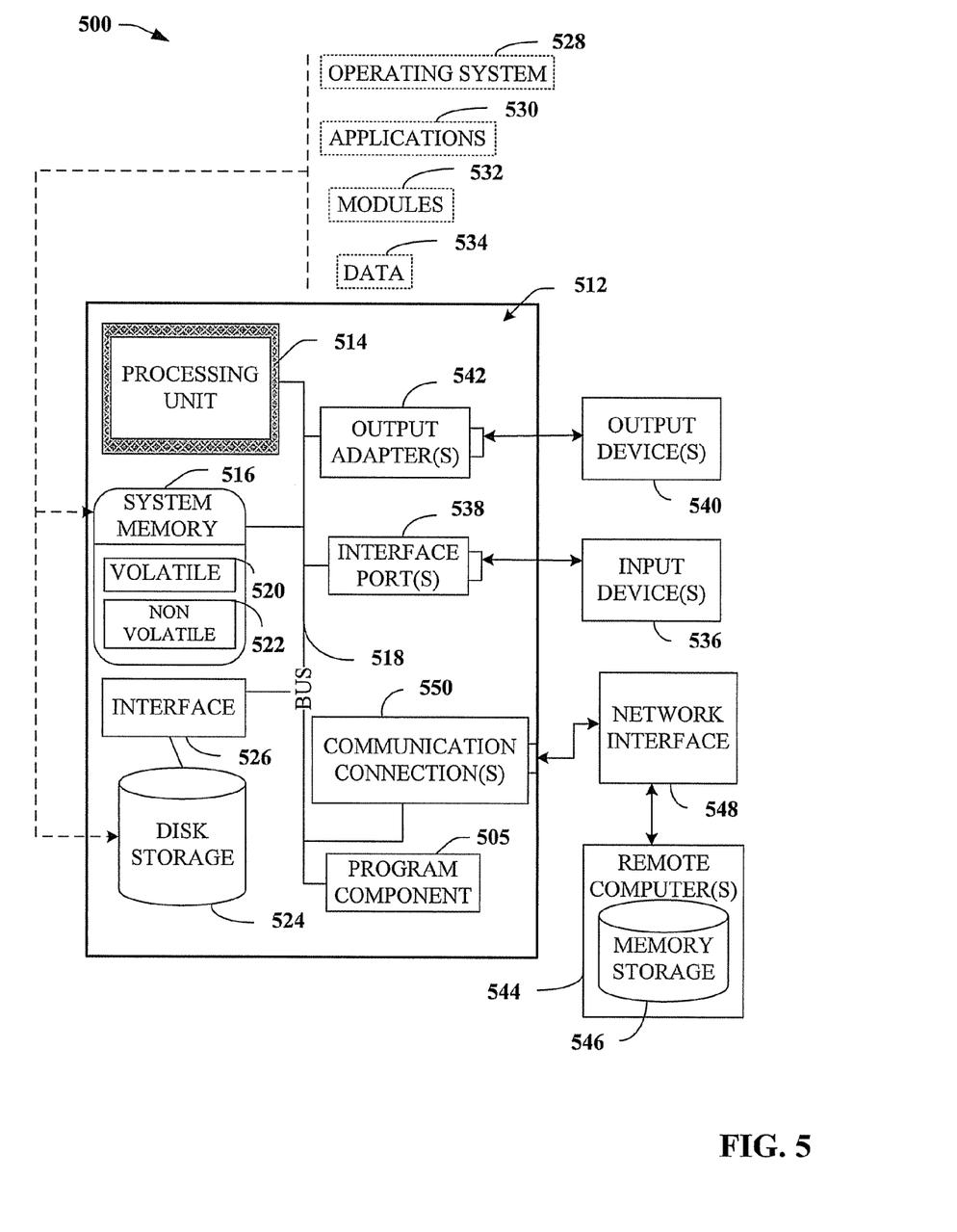
FIG. 5 illustrates a flow diagram of an example, non-limiting embodiment of a computer environment in connection with various aspects described herein.

With reference to FIG. 5, a suitable environment 500 for implementing various aspects of this disclosure includes a computer 512. The computer 512 includes a processing unit(s) 514, a system memory 516, and a system bus 518. The system bus 518 couples system components including, but not limited to, the system memory 516 to the processing unit 514. The processing unit(s) 514 can be any of various available processors. Dual microprocessors and other multiprocessor architectures also can be employed as the processing unit(s) 514.

The system bus 518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 794), and Small Computer Systems Interface (SCSI).

The system memory 516 includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 512 also includes removable/non-removable, volatile/non-volatile computer storage media. FIG. 5 illustrates, for example, a disk storage 524. Disk storage 524 includes, but is not limited to, devices like a magnetic disk drive, floppy disk drive, tape drive, Jaz drive, Zip drive, LS-100 drive, flash memory card, or memory stick. The disk storage 524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used, such as interface 526.

FIG. 5 also depicts software that acts as an intermediary between users and the basic computer resources described in the suitable operating environment 500. Such software includes, for example, an operating system 528. Operating system 528, which can be stored on disk storage 524, acts to control and allocate resources of the computer system 512. System applications 530 take advantage of the management of resources by operating system 528 through program modules 532 and program data 534, e.g., stored either in system memory 516 or on disk storage 524. It is to be appreciated that this disclosure can be implemented with various operating systems or combinations of operating systems.

A user enters commands or information into the computer 512 through input device(s) 536. Input devices 536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to computer 512, and to output information from computer 512 to an output device 540. Output adapter 542 is provided to illustrate that there are some output devices 540 like monitors, speakers, and printers, among other output devices 540, which require special adapters. The output adapters 542 include, by way of illustration and not limitation, video and sound cards that provide a means of connection between the output device 540 and the system bus 518. It should be noted that other devices and/or systems of devices provide both input and output capabilities such as remote computer(s) 544.

Computer 512 can operate in a networked environment using logical connections to one or more remote computers, such as remote computer(s) 544. The remote computer(s) 544 can be a personal computer, a server, a router, a network PC, a workstation, a microprocessor based appliance, a peer device or other common network node and the like, and typically includes many or all of the elements described relative to computer 512. For purposes of brevity, only a memory storage device 546 is illustrated with remote computer(s) 544. Remote computer(s) 544 is logically connected to computer 512 through a network interface 548 and then physically connected via communication connection 550. Network interface 548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to computer 512. The hardware/software necessary for connection to the network interface 548 includes, for exemplary purposes only, internal and external technologies such as, modems including regular telephone grade modems, cable modems and DSL modems, ISDN adapters, and Ethernet cards.

In accordance with various aspects and implementations, the computer 512 can be used to identify and avoid downloading redundant media data while streaming media. As more fully disclosed herein, in some implementations, the computer 512 can include one or more processors (e.g., processing units 514) that can be used to process data, including processing data to perform various tasks (e.g., analyzing media manifests to identify redundant data, detecting whether media data is audio or video data, downloading a first instance of the media data while skipping downloading redundant data). The computer 512 can include a program component 505 that can be associated with (e.g., communicatively connected to) the one or more processors. The program component 505 can contain, for example, an analysis component, a download, a detection component or other components, which can respectively function as more fully disclosed herein, to facilitate efficiently downloading redundant media data across streams.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A split loop timing recovery apparatus, comprising:
a first path configured for performing frequency offset tracking on a signal by adjusting a receiver clock frequency to match a remote transmitter frequency associated with the signal and further configured for performing delta sigma modulation; and
a second path configured for tracking random jitter on the signal.

2. The split loop timing recovery apparatus of claim 1, wherein the first path has a lower bandwidth than the second path.

3. The split loop timing recovery apparatus of claim 1, wherein the second path comprises a phase interpolator.

4. The split loop timing recovery apparatus of claim 1 wherein bandwidth associated with timing recovery is partitioned between the first path and the second path.

5. The split loop timing recovery apparatus of claim 4, wherein the bandwidth is split between the first path and the second path based on an analysis of the signal.

6. The split loop timing recovery apparatus of claim 1, further comprising:
a predistortion module configured for predistorting a control signal going into the second path based on a lookup table.

7. The split loop timing recovery apparatus of claim 6, wherein the control signal is predistorted to reduce distortion of a recovered phase interpolator clock.

8. A method for performing split loop timing recovery, comprising:
performing frequency offset tracking on a signal on a first path by adjusting a receiver clock frequency to match a remote transmitter frequency associated with the signal, wherein the performing frequency offset tracking is performed via delta sigma modulation; and
tracking random jitter on the signal on a second path.

9. The method for performing split loop timing recovery of claim 8, wherein the tracking high bandwidth random jitter is performed in a higher bandwidth path than the frequency offset tracking.

10. The method for performing split loop timing recovery of claim 9, further comprising:
partitioning bandwidth associated with timing recovery between the frequency offset tracking and random jitter tracking performed by a phase interpolator on the second path based on an analysis of the signal.

11. The method for performing split loop timing recovery of claim 10, wherein the partitioning bandwidth is based on an analysis of the signal.

12. The method for performing split loop timing recovery of claim 8, further comprising:
predistorting a control signal going into a phase interpolator on the second path based on a lookup table.

13. The method of claim 12, wherein the predistorted control signal reduces distortion of a recovered phase interpolator clock.

14. A system for split loop timing recovery, comprising:
a delta sigma modulation loop configured for performing frequency offset tracking on a signal on a first path by adjusting a receiver clock frequency to match a remote transmitter frequency associated with the signal; and
a phase interpolator loop configured for tracking random jitter on the signal on a second path.

15. The system for split loop timing recovery of claim 14, wherein the delta sigma modulation loop is a lower bandwidth loop than the phase interpolator loop.

16. The system for split loop timing recovery of claim 14, further comprising:
a partitioning circuit configured for partitioning bandwidth between the delta sigma modulation loop and the phase interpolator.

17. The system for split loop timing recovery of claim 16, wherein the partitioning circuit partitions the bandwidth based on an analysis of the signal.

18. The system for split loop timing recovery of claim 14, further comprising:
a predistortion module configured for predistorting a control signal going into the phase interpolator based on a lookup table.

19. A split loop timing recovery apparatus, comprising:
a first path configured for performing frequency offset tracking on a signal by adjusting a receiver clock frequency to match a remote transmitter frequency associated with the signal;
a second path configured for tracking random jitter on the signal; and
a predistortion module configured for predistorting a control signal going into the second path based on a lookup table.

20. The split loop timing recovery apparatus of claim 19, wherein the control signal is predistorted to reduce distortion of a recovered phase interpolator clock.

* * * * *